Mar. 6, 1923.

J. N. OPIE, 3d

PUMP PLUNGER

Filed Mar. 14, 1922

1,447,566

Inventor.
John N. Opie, 3rd

Attorney

Patented Mar. 6, 1923.

1,447,566

UNITED STATES PATENT OFFICE.

JOHN N. OPIE, 3D, OF BALTIMORE, MARYLAND.

PUMP PLUNGER.

Application filed March 14, 1922. Serial No. 543,671.

*To all whom it may concern:*

Be it known that I, JOHN N. OPIE, 3d, a citizen of the United States, residing at Baltimore city, State of Maryland, have invented certain new and useful Improvements in Pump Plungers; and I do hereby declare the following to be a full, clear, and exact description of the invention, such as will enable others skilled in the art to which it appertains to make and use the same.

This invention relates to new and useful improvements in plungers and particularly to plungers for pumps.

One object of the invention is to provide a plunger for a pump which is made up of fabric washers impregnated with a lubricant and tightly compressed to form a practically single unit.

Another object of the invention is to provide a plunger made up of a plurality of felt washers impregnated with an admixture of paraffin and tallow, which results in the maintaining of the felt in a firm and comparatively stiff condition, and wherein the lubricant will be fed to the working edge faces of the washers in an even constant flow.

Other objects and advantages will be apparent from the following description when taken in connection with the accompanying drawing.

Figure 1:
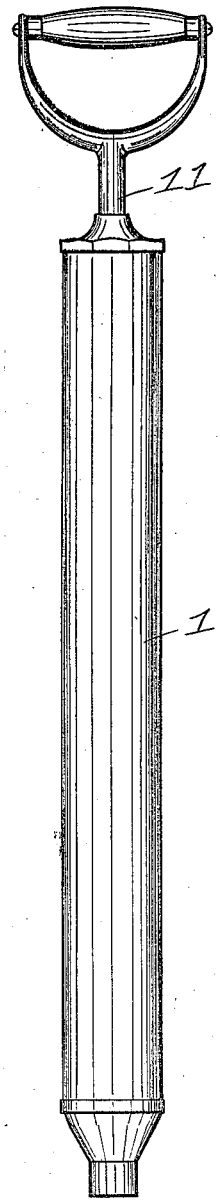
Figure 1 is an elevation of a pump made in accordance with the invention.
Figure 3:
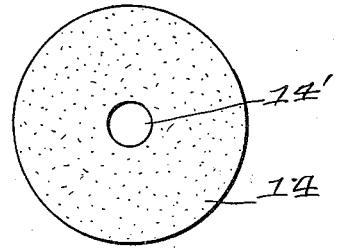
Figure 3 is a plan view of one of the washers.
Figure 4:
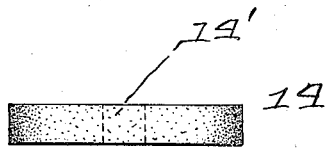
Figure 4 is an edge view of one of the washers.
Figure 2:
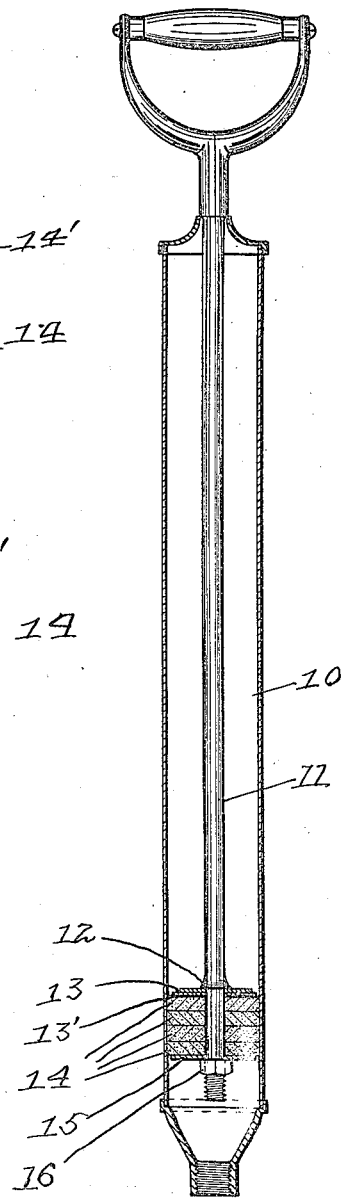
Figure 2 is a vertical longitudinal sectional view through the pump and plunger showing the improved plunger.

Referring particularly to the accompanying drawing 10 represents the barrel of a pump and 11 the plunger rod thereof, in connection with which the invention is used.

The lower end of the plunger rod 11 is formed with a shoulder 12, against which the metal disk 13 bears, a second metal disk being also disposed on the rod and arranged beneath the disk 13 at 13'. The plunger also has a series of felt washers 14 engaged thereon, below the disk 13' in close contact with each other, and below the lowermost of the felt washers is a metal disk 15, the same being held in position by the clamping nut 16, engaged on the lower end of the rod.

The washers 14 each comprises a disk or felt of suitable diameter and thickness and having a central opening 14', for the reception of the plunger rod 11 therethrough. Each washer 14 is impregnated with a mixture of paraffin and tallow, one part of paraffin and three parts tallow, the said mixture being disposed among the fibres of the washer as all points from the central opening 14', to the outer peripheral edge and upper and lower faces.

The washers 14 are tightly clamped between the disks 13 and 13', by the nut 16 and the shoulder 12.

The use of tallow and paraffin serves to maintain a clear flow of lubricant to the friction surface of the washer, and because of the fact that the entire washer is impregnated with the said mixture, there will be a constant supply of lubricant. The friction surface of the disk is kept free from any impediment to the flow of the lubricant. Furthermore, the presence of the paraffin and tallow, in the fibres of the felt, keep them firmly packed.

What is claimed is.

1. A plunger for a pump comprising a plurality of felt washers arranged in mutual and compressed contact with each other and each impregnated with one part of paraffin and three parts of tallow.

2. A plunger element consisting of a fibrous disk impregnated throughout its entire structure with a mixture of one part of paraffin and three parts of tallow.

In testimony whereof, I affix my signature, in the presence of two witnesses.

JOHN N. OPIE, 3RD.

Witnesses:
  MILTON DASHIELL,
  LILLIAN STEINBERG.